US008836761B2

(12) United States Patent
Wang et al.

(10) Patent No.: US 8,836,761 B2
(45) Date of Patent: Sep. 16, 2014

(54) 3D INFORMATION GENERATOR FOR USE IN INTERACTIVE INTERFACE AND METHOD FOR 3D INFORMATION GENERATION

(75) Inventors: Chuan-Wei Wang, Hsin-Chu (TW);
Hsin-Chia Chen, Hsin-Chu (TW);
Chih-Hung Lu, Hsin-Chu (TW)

(73) Assignee: Pixart Imaging Incorporated, Hsin-Chu (TW)

( * ) Notice: Subject to any disclaimer, the term of this patent is extended or adjusted under 35 U.S.C. 154(b) by 477 days.

(21) Appl. No.: 12/889,825

(22) Filed: Sep. 24, 2010

(65) Prior Publication Data

US 2012/0075422 A1    Mar. 29, 2012

(51) Int. Cl.
*H04N 13/00* (2006.01)
*H04N 13/02* (2006.01)
*G01C 3/08* (2006.01)

(52) U.S. Cl.
CPC ....... *H04N 13/0253* (2013.01); *H04N 13/0271* (2013.01)
USPC ............................................. 348/46; 356/610

(58) Field of Classification Search
USPC ........................................................ 348/46
See application file for complete search history.

(56) References Cited

U.S. PATENT DOCUMENTS

| | | | | |
|---|---|---|---|---|
| 6,155,490 | A * | 12/2000 | Ackley | 235/472.01 |
| 8,014,002 | B2 * | 9/2011 | Keshavmurthy et al. | 356/610 |
| 2006/0269896 | A1 | 11/2006 | Liu et al. | |
| 2008/0007722 | A1 | 1/2008 | Golab et al. | |
| 2008/0044079 | A1 * | 2/2008 | Chao et al. | 382/154 |
| 2009/0262363 | A1 * | 10/2009 | Keshavmurthy et al. | 356/511 |
| 2011/0102763 | A1 * | 5/2011 | Brown et al. | 356/4.01 |
| 2011/0187638 | A1 * | 8/2011 | Chao | 345/156 |
| 2011/0279449 | A1 * | 11/2011 | Chao | 345/419 |

\* cited by examiner

*Primary Examiner* — Sath V Perungavoor
*Assistant Examiner* — Howard D Brown, Jr.
(74) *Attorney, Agent, or Firm* — Tung & Associates

(57) ABSTRACT

The present invention discloses a 3D information generator for use in an interactive interface. The 3D information generator includes: a MEMS light beam generator having at least one light source for providing a dot light beam and a MEMS mirror for projecting a movable scanning light beam according to the dot light beam to an object; an image sensor for sensing an image of the object to generate a 2D image information; and a processor for generating a distance information by triangulation method according to a reflection result of the scanning light beam scanning on the object, wherein the distance information is combined with the 2D image information to generate a 3D information.

22 Claims, 6 Drawing Sheets

3D INFORMATION GENERATOR FOR USE IN INTERACTIVE INTERFACE AND METHOD FOR 3D INFORMATION GENERATION

BACKGROUND OF THE INVENTION

1. Field of Invention

The present invention relates to a 3D information generator for use in an interactive interface; particularly, it relates to a 3D information generator using triangulation method to generate distance information. The present invention also relates to a method for generating 3D information.

2. Description of Related Art

Conventionally, a device which detects movement by image recognition, such as a mouse or a game controller, only generates 2D information. Such 2D information generator typically includes a light source, an image sensor, and a processor. The light source projects a light beam to an object; the image sensor receives light reflected from the surface of the object and converts the reflected light to an electrical signal; and the processor generates 2D information according to the electrical signal. To generate 3D information, it usually requires another device such as an accelerator or a gyrosensor and it requires combining the information generated by the accelerator or gyro-sensor with the 2D information. Such kind of 3D information generator is therefore complicated in regard to hardware and calculation. There is another prior art device which uses time of flight (TOF) of the reflected light to obtain 3D information of the object, but it requires higher hardware cost.

US 2006/0269896, US 2008/0007722, and US 2009/0262363 disclose another type of 3D information generator, which uses a single dot laser beam to scan the object so it takes a relatively longer time to complete scanning. For applications which need to handle a large size of images (such like an interactive game), the frame rate is too low that it can not generate 3D information in real-time.

In view of the foregoing drawbacks, the present invention provides a 3D information generator for use in an interactive interface and a method for generating 3D information. The 3D information is generated by triangulation calculation, and the low frame rate issue is solved, such that 3D information can be generated in real-time.

SUMMARY OF THE INVENTION

The first objective of the present invention is to provide a 3D information generator for use in an interactive interface.

The second objective of the present invention is to provide a 3D information generation method.

To achieve the objectives mentioned above, from one perspective, the present invention provides a 3D information generator for use in an interactive interface, comprising: a MEMS (Micro-Electro-Mechanical System) light beam generator including a light source for providing at least one dot light beam and a MEMS mirror reflecting the dot light beam to project a scanning light beam to an object, the object reflecting the scanning light beam to generated reflected light; an image sensor for sensing an image including the object to generate 2D image information; and a processor for generating distance information by triangulation calculation according to the reflected light from the object, wherein the distance information is combined with the 2D image information to generate 3D information.

In one embodiment of the aforementioned 3D information generator, the MEMS light beam generator preferably further includes an optical conversion device for converting the dot light beam provided by the light source to a linear light beam, and the MEMS mirror reflects the linear light beam to scan the object by one-dimensional rotation of the MEMS mirror. The scanning light beam includes a predetermined pattern, and the processor generates the distance information according to the predetermined pattern.

In another embodiment of the aforementioned 3D information generator, the MEMS light beam generator preferably further includes an optical conversion device for converting the dot light beam provided by the light source to a planar light beam, and the MEMS mirror reflects the planar light beam to scan the object by one-dimensional rotation of the MEMS mirror. The scanning light beam includes a predetermined pattern, and the processor generates the distance information according to the predetermined pattern.

In the aforementioned 3D information generator, preferably, the light source projects a pulsation light beam with a field of view (FOV) less than 5 degree.

The aforementioned 3D information generator may further include a lens provided before the image sensor, for adjusting the image sensed by the image sensor.

The aforementioned 3D information generator may further include another sensor device for sensing color, sound, density, or vertical level of the object and generating corresponding information which is inputted inputting to the processor.

In one embodiment of the aforementioned 3D information generator, the MEMS light beam generator includes multiple dot light sources whose emission of light are controllable individually, and the multiple dot light beam sources as a whole project a linear light beam to the MEMS mirror which reflects the linear light beam to scan the object by one-dimensional rotation of the MEMS mirror. The scanning light beam includes a predetermined pattern, and the processor generates the distance information according to the predetermined pattern.

In another embodiment of the aforementioned 3D information generator, the MEMS mirror reflects the dot light beam to scan the object by two-dimensional rotation of the MEMS mirror. The scanning light beam includes a predetermined pattern, and the processor generates the distance information according to the predetermined pattern.

In another embodiment of the aforementioned 3D information generator, the MEMS mirror reflects the dot light beam provided by the light source, and the MEMS mirror adjusts the reflection angle of the dot light beam by one-dimensional rotation. The MEMS light beam generator further includes an optical conversion device for converting the reflected dot light beam to a linear light beam. The scanning light beam includes a predetermined pattern, and the processor generates the distance information according to the predetermined pattern.

The optical conversion device for example may be a cylinder lens or a diffraction optical element.

In another embodiment of the aforementioned 3D information generator, the MEMS mirror includes multiple mirrors which rotate independently and individually.

From another perspective, the present invention provides a 3D information generation method comprising: projecting a scanning light beam to an object, wherein the scanning light beam includes a predetermined pattern; sensing an image of the object to generate 2D image information; and generating distance information by triangulation calculation according to reflected light from the object, wherein the distance information is combined with the 2D image information to generate 3D information.

In one embodiment of the aforementioned 3D information generation method, the step of projecting a scanning light beam includes: projecting a linear light beam; and reflecting the linear light beam to scan the object by one-dimensional rotation of the MEMS mirror.

In another embodiment of the aforementioned 3D information generation method, the step of projecting a scanning light beam includes: projecting a dot light beam; and reflecting the dot light beam to scan the object by two-dimensional rotation of the MEMS mirror.

In another embodiment of the aforementioned 3D information generation method, the step of projecting a scanning light beam includes: projecting a dot light beam; converting the dot light beam to a linear light beam or a planar light beam by an optical conversion device; and reflecting the linear light beam or the planar light beam to scan the object by one-dimensional rotation of the MEMS mirror.

In another embodiment of the aforementioned 3D information generation method, the step of projecting a scanning light beam includes: projecting a dot light beam; reflecting the dot light beam and adjusting the reflection angle of the dot light beam by one-dimensional rotation of a MEMS mirror; and converting the dot light beam reflected by the MEMS mirror to a linear light beam or a planar light beam by an optical conversion device, and projecting the linear light beam or the planar light beam to the object.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, but not drawn according to actual scale.

Figure 1A:
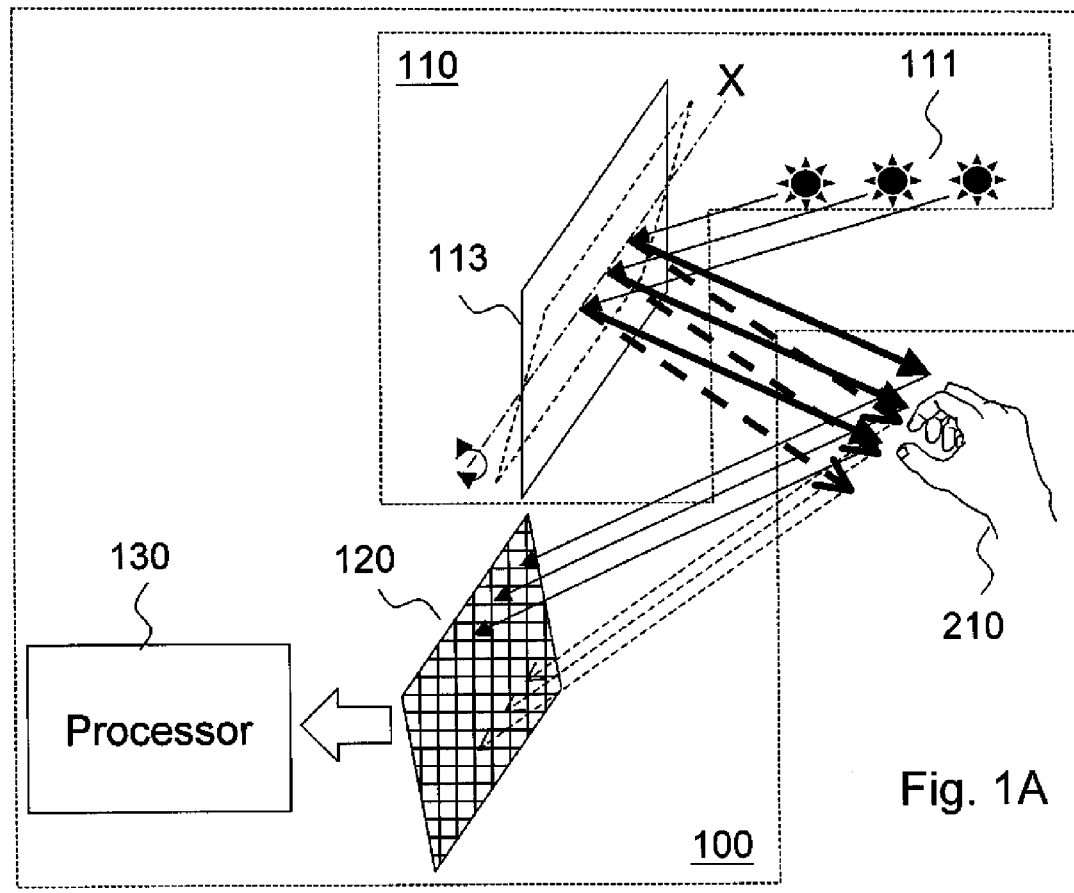
FIG. 1A shows an embodiment of the present invention.

FIG. 1A shows an embodiment of the present invention. As shown in the figure, the 3D information generator 100 includes a MEMS light beam generator 110. The MEMS light beam generator 110 has a light source 111, formed by multiple dot light sources whose emission of light are controllable individually. The light source 111 projects a linear light beam to a MEMS mirror 113, and the MEMS mirror 113 reflects the linear light beam to an object 210, as indicated by thick solid arrow lines. The MEMS mirror 113 is rotatable one-dimensionally along X-axis; by its rotation, the linear light beam forms a scanning light beam to scan the object 210, as indicated by the thick dash arrow lines. The 3D information generator 100 also includes an image sensor 120 for receiving 2D image information of the object and the light reflected from the object 210. The processor 130 receives the 2D image information of the object 210, and generates distance information by triangulation calculation according to the reflected light from the object 210. The distance information is combined with the 2D image information to generate 3D information related to the object 210.

Figure 1B:
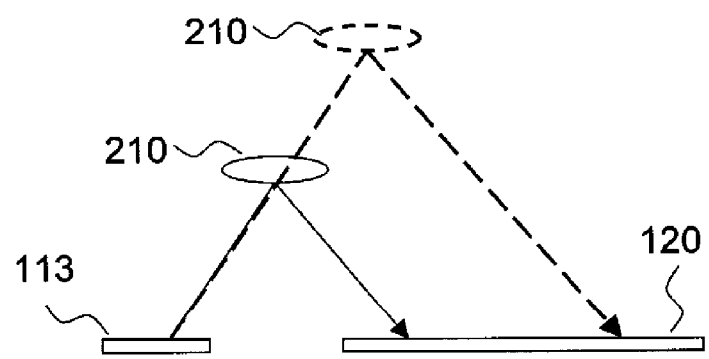
FIG. 1B illustrates the triangulation method.

FIG. 1B illustrates how to generate the distance information by triangulation method. As shown in this figure, after light is reflected from the MEMS mirror 113 to the object 210, it is reflected from the object 210 to the image sensor 120, and received by the image sensor 120. The distance between the object 210 and the image sensor 120 can be determined according to the position where the reflected light is reflected to on the image sensor 120.

Figure 1C:
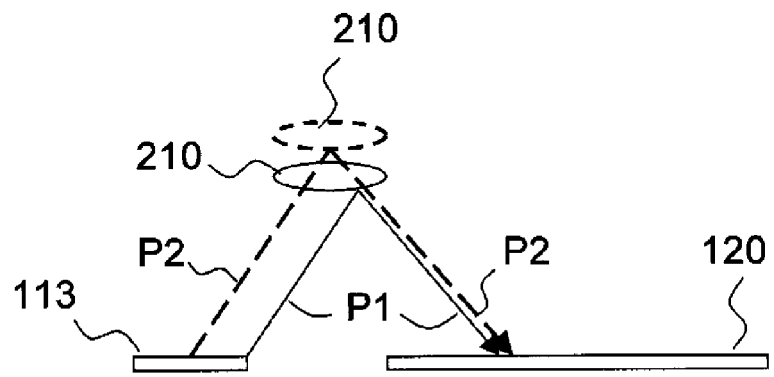
FIG. 1C illustrates that the distance could be misjudged.
Figure 1D:
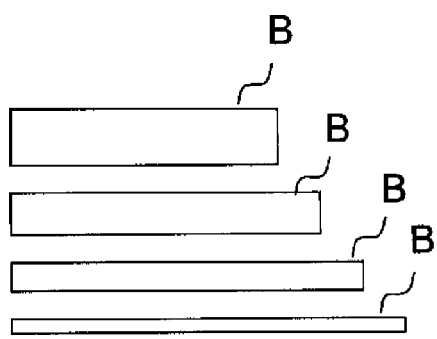
FIGS. 1D-1F shows several examples of the pattern that can be designed in the scanning light beam.
Figure 1E:
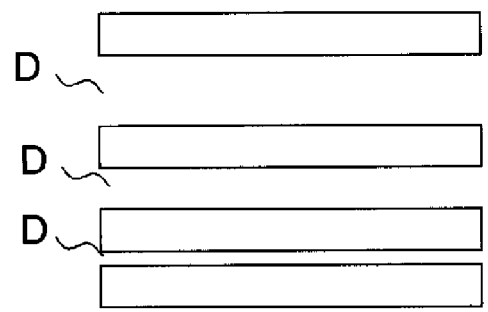
Figure 1F:
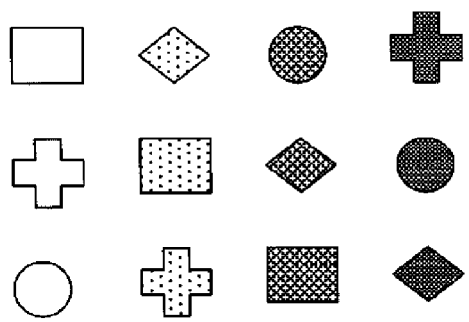

The dot light source is preferably a collimated light source, which projects a pulsation light beam with a field of view (FOV) less than 5 degree. In a preferred embodiment, the scanning light beam may include predetermined pattern information for correctly determining the distance. Referring to FIG. 1C, when the scanning light beam does not include pattern information, a misjudgment may happen which mistakes the path P1 to be the path P2 (or vice versa), and thus it could generate wrong distance information. But if the scanning light beam includes pattern information, the path by which the scanning light beam goes through can be correctly identified. The aforementioned pattern information can be designed in various ways. For example, as shown in FIG. 1D, multiple bright regions B with different sizes may be provided in the pattern; or as shown in FIG. 1E, multiple dark regions D with different sizes may be provided in the pattern; or as shown in FIG. 1F, the pattern may include regions of different colors, shapes, orders, etc. In brief, the scanning light beam can be embedded with pattern information by regions of different brightness, colors, shapes, sizes, textures, densities, etc. The pattern information may be generated by the light source 111 (for example by arranging the distribution, ON/OFF frequency, brightness, color, etc. of one or multiple light sources), or by controlling the rotation of the MEMS mirror 113, or both, such that a specific pattern is formed by the scanning light beam. Note that in the pattern, a local region does not need to have any relationship with another region in the pattern. For example, there are repeated regions in the pattern shown in FIG. 1F, but this is not necessary.

Figure 2:
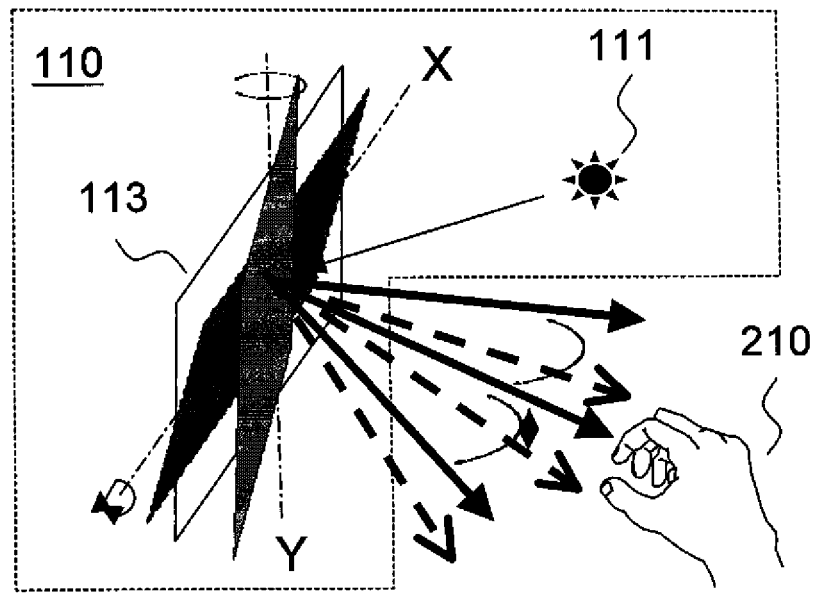
FIGS. 2-5 shows four embodiments of the MEMS light beam generator of the present invention.

FIG. 2 shows another embodiment of the MEMS light beam generator 110. In this embodiment, the light source 111 includes at least one dot light source. The MEMS mirror 113 reflects one (or more) dot light beam to the object 210 by its two-dimensional rotation along the X-axis and Y-axis. The processor 130 (not shown) generates distance information by triangulation calculation according to the light reflected from the object 210. The distance information is combined with the 2D image information of the object to generate 3D information related to the object 210. Similar to the previous embodiment, the scanning light beam preferably includes pattern information. The pattern information for example may be generated by the light source 111, or by controlling the rotation of the MEMS mirror 113.

Figure 3:
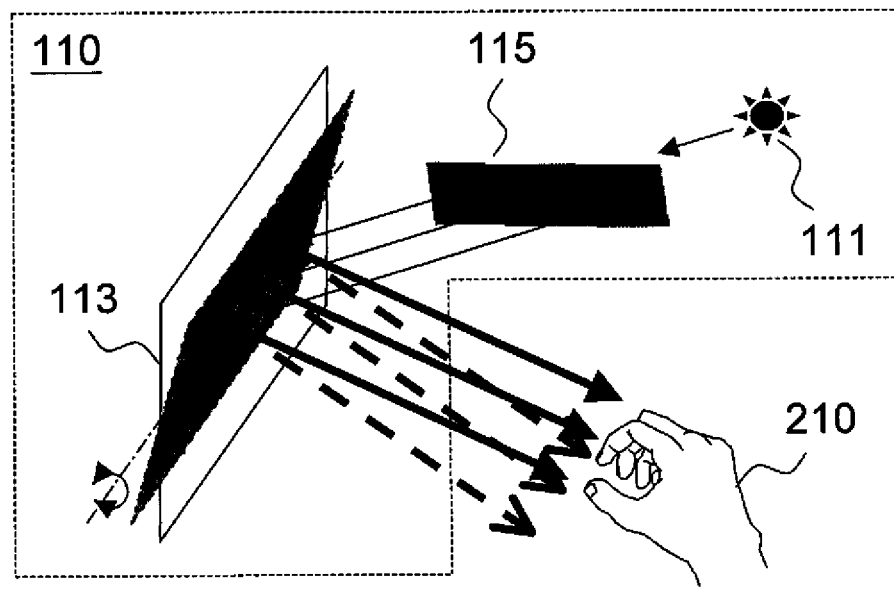

FIG. 3 shows another embodiment of the MEMS light beam generator 110. In this embodiment, the light source 111 includes at least one dot light source. The MEMS light beam generator 110 further includes at least one optical conversion device 115 (the details of the optical conversion device 115 will be described later) for converting one (or more) dot light beam provided by the light source 111 to a linear light beam. The MEMS mirror 113 reflects the linear light beam to the object 210, and the MEMS mirror 113 rotates one-dimensionally along the X-axis, such that the reflected linear light beam forms a scanning light beam for scanning the object 210. The processor 130 (not shown) generates distance information by triangulation calculation according to the light reflected from the object 210. The scanning light beam preferably includes pattern information, and the pattern information for example may be generated by the light source 111, or by controlling the rotation of the MEMS 113, or by arranging the structure of the optical conversion device 115.

Figure 4:
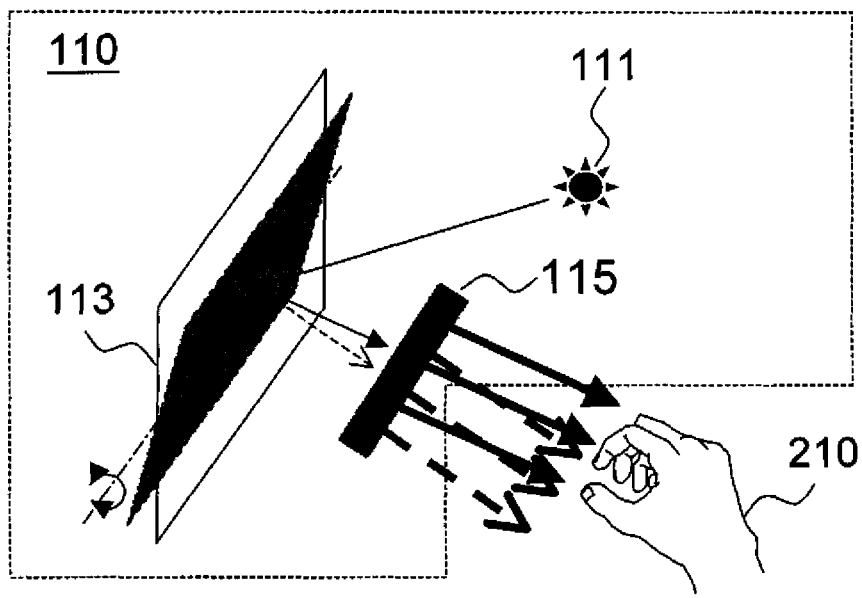

FIG. 4 shows another embodiment of the MEMS light beam generator 110. In this embodiment, the light source 111 includes at least one dot light source. The MEMS light beam generator 110 further includes at least one optical conversion device 115 provided between the MEMS mirror 113 and the object 210. The MEMS mirror 113 reflects the dot light beam (or multiple dot light beams) projected from the light source 111 to the optical conversion device 115. The optical conversion device 115 converts the dot light beam(s) to a linear light beam which is projected to the object 210. The MEMS mirror 113 rotates one-dimensionally along the X-axis, such that the converted linear light beam forms a scanning light beam for scanning the object 210. Similar to the aforementioned embodiments, the scanning light beam preferably includes pattern information. The pattern information for example may be generated by the light source 111, or by controlling the rotation of the MEMS mirror 113, or by arranging the structure of the optical conversion device 115.

Figure 5:
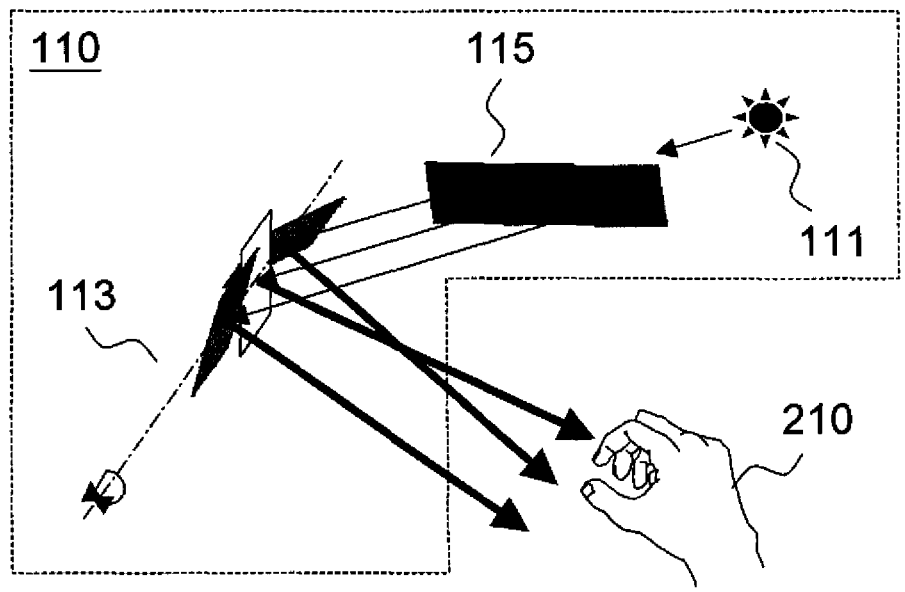

FIG. 5 shows another embodiment of the MEMS light beam generator 110. In this embodiment, the light source 111 includes at least one dot light source. The MEMS light beam generator 110 further includes at least one optical conversion device 115 for converting the dot light beam to a linear light beam. The MEMS mirror 113 includes multiple mirrors which are preferably rotatable individually and independently. As shown in this figure, these mirrors for example (but not necessarily) can be arranged such that they are rotatable one-dimensionally along a common X-axis, respectively. The reflected linear light beam forms a scanning light beam which scans the object 210. Alternatively, the mirrors may be designed such that each of which is rotatable along another dimension (not the common X-axis), or rotatable two-dimensionally. Similar to the aforementioned embodiments, the scanning light beam preferably includes pattern information. The pattern information for example may be generated by the light source 111, or by controlling the rotation of the MEMS mirror 113, or by arranging the structure of the optical conversion device 115.

Figure 6:
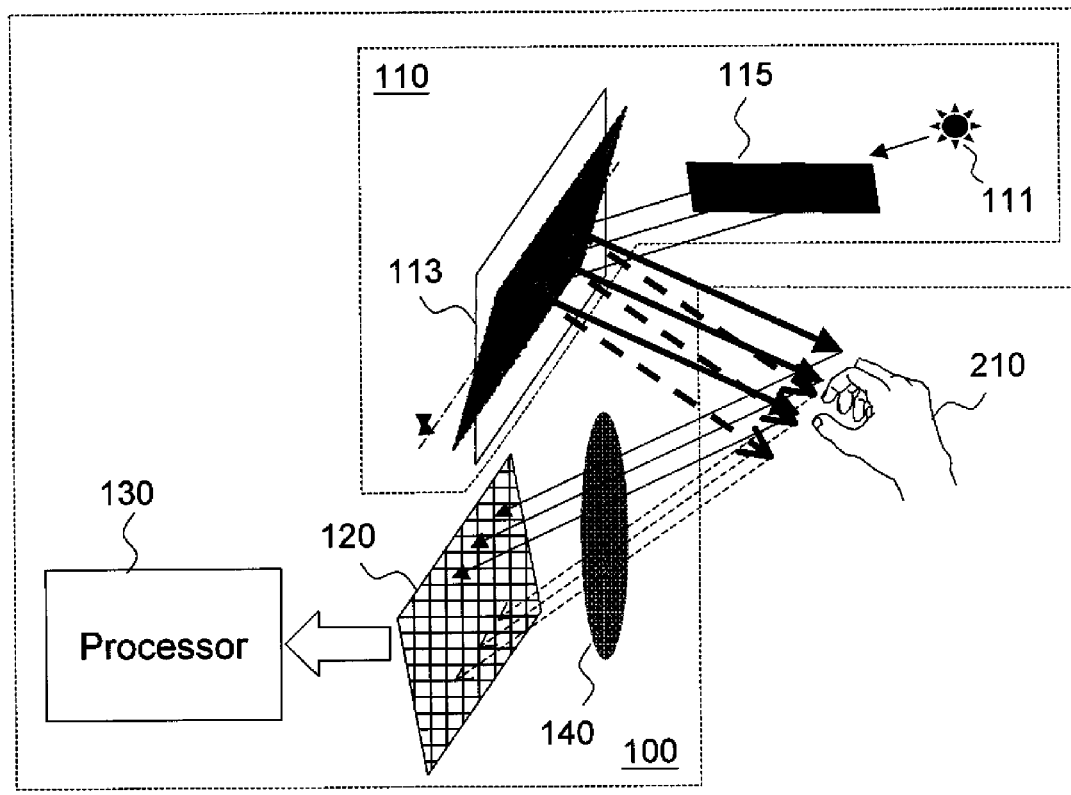
FIGS. 6-7 shows two other embodiments of the present invention.

FIG. 6 shows another embodiment of the MEMS light beam generator 110. This embodiment is different from the embodiment shown in FIG. 3 in that, the 3D information generator 100 further includes a lens provided between the image sensor 120 and the object 210. The lens can adjust the image information received by the image sensor as required.

Figure 7:
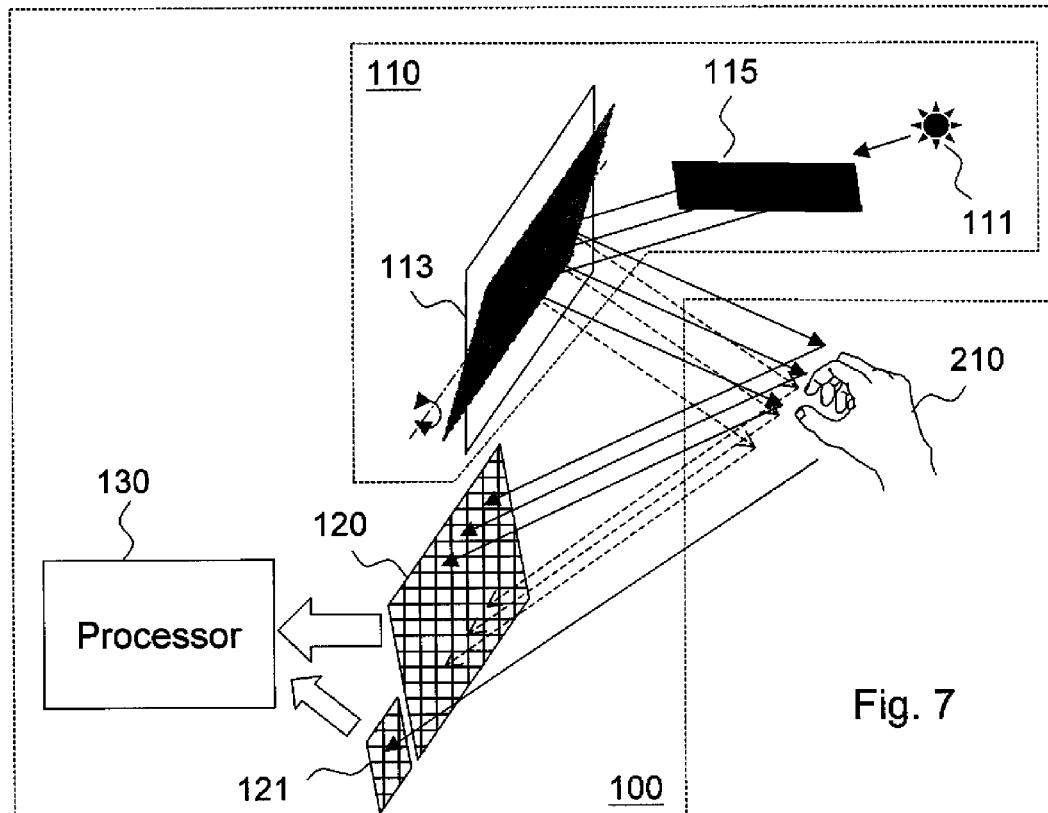

FIG. 7 shows another embodiment of the MEMS light beam generator 110. This embodiment is different from the embodiment shown in FIG. 3 in that, the 3D information generator 100 further includes another sensor device 121 besides the image sensor 120. The sensor device 121 senses color, sound, density, or vertical level, etc, of the object 210 and generates corresponding information which is inputted to the processor 130.

The optical conversion device 115 described in some of the aforementioned embodiments for example may be a cylinder lens or a diffractive optical element (DOE).

Figure 8:
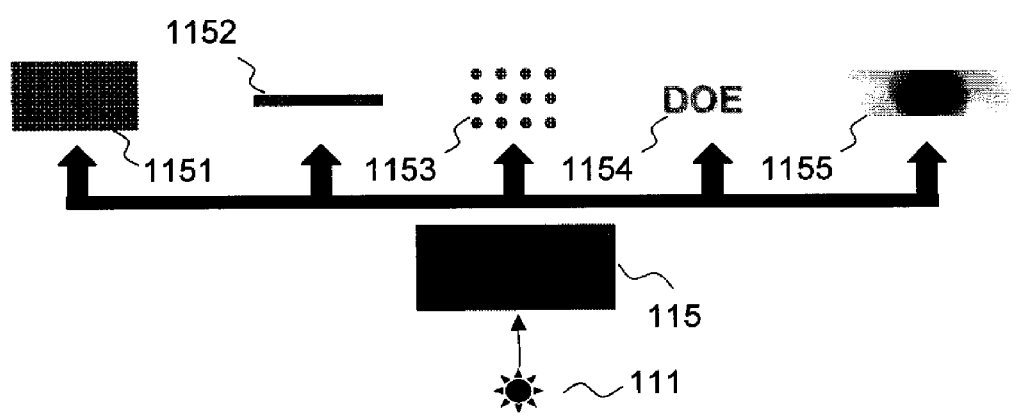
FIG. 8 shows five embodiments of planar light beams converted from a dot light beam according to the present invention.

In addition, in the aforementioned embodiments wherein the optical conversion device 115 is provided, it may be designed such that the optical conversion device 115 converts the dot light beam to a linear light beam or a planar light beam. As shown in FIG. 8, the light beam projected from the light source 111, or the light beam reflected from the MEMS mirror 113 (not shown), can be converted by the optical element 115 to a light beam of certain predetermined pattern, such a planar light beam 1151, a linear light beam 1152, a planar light beam with dot arrays 1153, an alphabet-shaped planar light beam 1154, a planar light beam with variable densities 1155, or a combination of the above.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, besides the object 210, a reference target may be provided for obtaining more precise distance information. For another example, the sensor device 121 may be integrated into the image sensor 120. For another example, the shape or the size of the planar light beam is not limited to the examples shown in the aforementioned embodiments, the planar light beam can be of any regular or irregular shape of any size. For another example, the object is not limited to part or all of a human hand or a human body; it can be anything held or not held by human body. For another example, the MEMS mirror 113 can be rotatable one-dimensionally along the Y-axis instead of the X-axis. For another example, the dot light beam projected from the dot light source is not limited to a laser beam, but may be an infrared beam or any other electromagnetic wave that can focus. In view of the foregoing, the spirit of the present invention should cover all such and other modifications and variations, which should be interpreted to fall within the scope of the following claims and their equivalents.

What is claimed is:

1. A 3D information generator for use in an interactive interface comprising:
   a MEMS (Micro-Electro-Mechanical System) light beam generator including a light source for providing at least one dot light beam and a MEMS mirror reflecting the dot light beam to project a scanning light beam to an object, the object reflecting the scanning light beam to generate reflected light, wherein the scanning light has a predetermined pattern including regions of different colors, shapes, sizes, or densities, each of the different colors, shapes, sizes, or densities being uniquely identifiable and not the same as the rest regions of the predetermined pattern;
   an image sensor receiving reflected light, for sensing an image including the object to generate 2D image information; and
   a processor for generating distance information related to a distance between the object and the 3D information generator by triangulation calculation according to the reflected light from the object,
   wherein the triangulation calculation calculates the distance information according to a location of the predetermined pattern in the image sensed by the image sensor and a differentiation of the predetermined pattern with respect to colors, shapes, sizes, or densities, so as not to misjudge the distance, and
   wherein the distance information is combined with the 2D image information to generate 3D information.

2. The 3D information generator of claim 1, wherein the MEMS light beam generator includes at least one dot light source whose emission of light is controllable.

3. The 3D information generator of claim 1, wherein the MEMS light beam generator includes multiple dot light sources whose emission of light are controllable individually, and the multiple dot light sources as a whole project a linear light beam to the MEMS mirror which reflects the linear light beam to scan the object by one-dimensional rotation of the MEMS mirror.

4. The 3D information generator of claim 1, wherein the MEMS mirror reflects the dot light beam to scan the object by two-dimensional rotation of the MEMS mirror.

5. The 3D information generator of claim 1, wherein the MEMS light beam generator further includes an optical conversion device for converting the dot light beam provided by the light source to a linear light beam, and the MEMS mirror reflects the linear light beam to scan the object by one-dimensional rotation of the MEMS mirror.

6. The 3D information generator of claim 1, wherein the MEMS light beam generator further includes an optical conversion device for converting the dot light beam provided by the light source to a planar light beam, and the MEMS mirror reflects the planar light beam to scan the object by one-dimensional rotation of the MEMS mirror.

7. The 3D information generator of claim 6, wherein the optical conversion device is a cylinder lens or a diffraction optical element.

8. The 3D information generator of claim 1, wherein in reflecting the dot light beam provided by the light source, the MEMS mirror adjusts a reflection angle of the dot light beam by one-dimensional rotation of the MEMS mirror, and wherein the MEMS light beam generator further includes an optical conversion device for converting the reflected dot light beam to a linear light beam to form the scanning light beam which is projected to the object.

9. The 3D information generator of claim 8, wherein the optical conversion device is a cylinder lens or a diffraction optical element.

10. The 3D information generator of claim 1, wherein the MEMS mirror includes multiple mirrors rotatable independently and individually.

11. The 3D information generator of claim 1, wherein the light source projects a pulsation light beam with a field of view (FOV) less than 5 degree.

12. The 3D information generator of claim 1, further comprising a lens provided before the image sensor, for adjusting the image sensed by the image sensor.

13. The 3D information generator of claim 1, further comprising another sensor for sensing color, sound, density, or vertical level of the object and generating corresponding information which is inputted to the processor.

14. A 3D information generation method comprising:
projecting a scanning light beam to an object, wherein the scanning light beam includes a predetermined pattern including regions of different colors, shapes, sizes, or densities, each of the different colors, shapes, sizes, or densities being uniquely identifiable and not the same as the rest regions of the predetermined pattern;
receiving reflected light from the object and sensing an image of the object to generate 2D image information; and
generating information of a distance by triangulation calculation according to reflected light from the object,
wherein the triangulation calculation calculates the information of the distance according to a location of the predetermined pattern in the sensed image and a differentiation of the predetermined pattern with respect to colors, shapes, sizes, or densities, so as not to misjudge the distance, and
wherein the information of the distance is combined with the 2D image information to generate 3D information.

15. The 3D information generation method of claim 14, wherein the step of projecting a scanning light beam includes:
projecting a linear light beam; and
reflecting the linear light beam to can the object by one-dimensional rotation of a MEMS mirror.

16. The 3D information generation method of claim 14, wherein the step of projecting a scanning light beam includes:
projecting a dot light beam; and
reflecting the dot light beam to scan the object by two-dimensional rotation of a MEMS mirror.

17. The 3D information generation method of claim 14, wherein the step of projecting a scanning light beam includes:
projecting a dot light beam;
converting the dot light beam to a linear light beam or a planar light beam by an optical conversion device; and
reflecting the linear light beam or the planar light beam to scan the object by one-dimensional or two-dimensional rotation of the MEMS mirror.

18. The 3D information generation method of claim 17, wherein the optical conversion device is a cylinder lens or a diffraction optical element.

19. The 3D information generation method of claim 14, wherein the step of projecting a scanning light beam includes:
projecting a dot light beam; reflecting the dot light beam and adjusting the reflection angle of the dot light beam by one-dimensional rotation of a MEMS mirror; and
converting the dot light beam reflected by the MEMS mirror to a linear light beam or a planar light beam by an optical conversion device, and projecting the linear light beam or the planar light beam to the object.

20. The 3D information generation method of claim 19, wherein the optical conversion device is a cylinder lens or a diffraction optical element.

21. The 3D information generation method of claim 14, wherein the MEMS mirror includes multiple mirrors rotatable independently and individually.

22. The 3D information generation method of claim 14, further comprising sensing information of color, sound, density, or vertical level of the object, and combining the sensed information with the 3D information to form stereo object information.

* * * * *